United States Patent
Lundberg et al.

(10) Patent No.: US 7,074,300 B2
(45) Date of Patent: Jul. 11, 2006

(54) CELLULOSE FIBER-BASED COMPOSITIONS AND THEIR METHOD OF MANUFACTURE

(75) Inventors: Brock Lundberg, St. Paul, MN (US); Lin Gu, St. Paul, MN (US); Rongsheng Roger Ruan, Arden Hills, MN (US); Ling Chen, Roseville, MN (US); Paul Bradley Addis, St. Paul, MN (US); Jack Edgar Johnson, Waseca, MN (US)

(73) Assignees: Regents of the University of Minnesota, Minneapolis, MN (US); Agricultural Utilization Research Institute, Crookston, MN (US)

( * ) Notice: Subject to any disclaimer, the term of this patent is extended or adjusted under 35 U.S.C. 154(b) by 18 days.

(21) Appl. No.: 10/303,256

(22) Filed: Nov. 25, 2002

(65) Prior Publication Data

US 2003/0116289 A1 Jun. 26, 2003

Related U.S. Application Data

(62) Division of application No. 09/432,945, filed on Nov. 3, 1999, now Pat. No. 6,506,435.

(51) Int. Cl.
*B29D 23/00* (2006.01)
*A23L 1/05* (2006.01)
*D21C 3/02* (2006.01)

(52) U.S. Cl. .......................... 162/90; 162/96; 162/99; 162/176; 426/578; 426/661; 426/506; 426/518; 426/519; 428/34.8

(58) Field of Classification Search ................ 426/578, 426/661, 506, 518, 519; 162/90, 96, 99, 176; 428/34.8; 536/76
See application file for complete search history.

(56) References Cited

U.S. PATENT DOCUMENTS

| | | |
|---|---|---|
| 2,487,114 A | 11/1949 | Dreyfus |
| 3,539,365 A | 11/1970 | Durand et al. |
| 3,653,925 A | 4/1972 | Anker et al. |
| 3,660,183 A | 5/1972 | Knowles et al. |
| 3,664,844 A | 5/1972 | Miller et al. |
| 4,226,982 A | 10/1980 | Blount |
| 4,259,147 A | 3/1981 | Gordy |

(Continued)

FOREIGN PATENT DOCUMENTS

BZ    9005762 A    6/1992

(Continued)

OTHER PUBLICATIONS

Ang, "Water retention capacity and viscosity effect of powdered cellulose," *Journal of Food Science*, 1991; 56(6):1682–1684.

Ang et al., "Multiple functions of powdered cellulose as a food ingredient," *Cereal Foods World*, 1991; 36(7):558–564.

(Continued)

*Primary Examiner*—N. Bhat
(74) *Attorney, Agent, or Firm*—Mueting, Raasch & Gebhardt, P.A.

(57) ABSTRACT

The present invention comprises an improved method for refining cellulose that produces a highly refined cellulosic material. The method comprises soaking raw material in a mild NaOH using reduced temperatures and pressures, and refining the material with a plate refiner so that a waste water stream is reduced in volume and has a pH within a range of 8 to 9. The present invention also comprises a HRC gel having a lignin concentration of at least about one (1)% by weight, and a water retention capacity of about 25 to at least about 56 g $H_2O$/g dry HRC.

17 Claims, 3 Drawing Sheets

U.S. PATENT DOCUMENTS

| | | | |
|---|---|---|---|
| 4,294,653 A | 10/1981 | Lindahl et al. | |
| 4,307,121 A | 12/1981 | Thompson | |
| 4,341,807 A | 7/1982 | Turbak et al. | |
| 4,374,702 A | 2/1983 | Turbak et al. | |
| 4,378,381 A | 3/1983 | Turbak et al. | |
| 4,413,017 A | 11/1983 | Loader | 426/616 |
| 4,452,721 A | 6/1984 | Turbak et al. | |
| 4,483,743 A * | 11/1984 | Turbak et al. | 162/100 |
| 4,486,459 A | 12/1984 | Thompson | |
| 4,543,370 A | 9/1985 | Porter et al. | |
| 4,649,113 A | 3/1987 | Gould | |
| 4,652,324 A | 3/1987 | Yamashina et al. | |
| 4,661,359 A | 4/1987 | Seaborne et al. | |
| 4,774,098 A | 9/1988 | Gould et al. | |
| 4,806,203 A | 2/1989 | Elton | |
| 4,806,475 A | 2/1989 | Gould | |
| 4,810,534 A | 3/1989 | Seaborne et al. | |
| 4,915,971 A | 4/1990 | Fennema et al. | |
| 4,957,599 A | 9/1990 | Chou et al. | |
| 4,960,763 A | 10/1990 | Stephens et al. | |
| 4,997,488 A | 3/1991 | Gould et al. | |
| 5,017,319 A | 5/1991 | Shen | |
| 5,023,097 A | 6/1991 | Tyson | |
| 5,023,103 A | 6/1991 | Ramaswamy | |
| 5,057,334 A | 10/1991 | Vail | |
| 5,069,919 A | 12/1991 | Weibel | |
| 5,089,307 A | 2/1992 | Ninomiya et al. | |
| 5,123,962 A | 6/1992 | Komuro et al. | |
| 5,126,152 A | 6/1992 | Feeney et al. | |
| 5,147,670 A | 9/1992 | Cebula et al. | |
| 5,385,640 A | 1/1995 | Weibel et al. | |
| 5,393,333 A | 2/1995 | Trouve | |
| 5,415,804 A | 5/1995 | Minami et al. | |
| 5,487,419 A * | 1/1996 | Weibel | 162/9 |
| 5,503,996 A | 4/1996 | Torget et al. | |
| 5,529,663 A | 6/1996 | Springer | |
| 5,626,810 A | 5/1997 | Zikeli et al. | |
| 5,643,359 A | 7/1997 | Soroushian et al. | |
| 5,766,662 A | 6/1998 | Inglett | |
| 5,769,934 A | 6/1998 | Ha et al. | |
| 5,817,381 A | 10/1998 | Chen et al. | |
| 5,964,983 A | 10/1999 | Dinand et al. | 162/27 |
| 6,083,582 A | 7/2000 | Chen et al. | |
| 6,183,596 B1 * | 2/2001 | Matsuda et al. | 162/9 |
| 6,231,913 B1 | 5/2001 | Schwimmer et al. | 426/605 |
| 6,251,458 B1 * | 6/2001 | Weibel | 426/321 |
| 6,273,994 B1 | 8/2001 | Creber et al. | |
| 6,506,435 B1 | 1/2003 | Lundberg et al. | |
| 2002/0060382 A1 | 5/2002 | Luo et al. | 264/555 |
| 2003/0144245 A1 * | 7/2003 | Addis et al. | 514/57 |
| 2004/0086626 A1 | 5/2004 | Lundberg et al. | 426/658 |

FOREIGN PATENT DOCUMENTS

| | | |
|---|---|---|
| EP | 0 102 829 B1 | 11/1987 |
| EP | 00337653 | 10/1989 |
| JP | 09071677 A | 3/1997 |
| JP | 09195194 A | 7/1997 |
| WO | WO 00/05310 | 2/2000 |
| WO | WO 01/32978 A1 | 5/2001 |

OTHER PUBLICATIONS

"Commercially–viable edible coatings face several challenges", *Emerging Food R&D Report*, Jun. 1, 1994.

"Consider edible collagen film for packaging", *Emerging Food R&D Report*, Oct. 1, 1995.

Debeaufort et al., "Effect of surfactants and drying rate on barrier properties of emulsified edible films", *International Journal of Food Science and Technology*, 1995; 30:183–190.

"Executives . . . FYI", *Emerging Food R&D Report*, Sep. 1, 1995; 1 pg.

Falk et al., "On the Relation Between Turgor Pressure and Tissue Rigidity", *Physiologia Plantarum*, 1958; 11:802–837.

Fast, "Chapter 2: Manufacturing Technology of Ready–to–Eat Cereals," *Breakfast Cereals, and how they are made*, Fast et al., eds., American Association of Cereal Chemists, Inc., St. Paul, MN, 1990; 15–42.

Forcinio, "Extending Freshness and Shelf Life", *Food Manufacturing & Packaging*, 1994; 163(12):87–90.

Frey–Wyssling, "Deformation of Plant Wall Cells", *Deformation and Flow in Biological Systems*, Chap. III., Edited by A. Frey–Wyssling, North Holland Publishing Company, publishers, 1952; 194–254.

Gennadios et al., "Edible Films and Coatings from Wheat and Corn Proteins," *Food Technology*, 1990; 63–69.

Goddard, "Now you can have your pack and eat it", *Packaging Week*, 1994; 10(22):28–29.

Gould, "Alkaline Peroxide Delignification of Agricultural Residues to Enhance Enzymatic Saccharification," *Biotechnology and Bioengineering*, vol. XXVI; 46–52.

Hatakeyama, "Structure and properties of the amorphous region of cellulose," *Cellulose: structural and functional aspects*, New York, 1989; 45–52.

Hoseney, "Principles of cereal science and technology", *American Association of Cereal Chemists*, publisher, 1986; 300–301.

Kester et al., "Edible Films and Coatings: A Review", *Food Technology*, 1986; 47–59.

Krässig, "Cellulose: Structure, Accessibility and Reactivity," *Polymer Monographs*, 1992; Table of Contents.

Krochta et al., "Edible Coatings and Films to Improve Food Quality", *Food Trade Review*, 1994; 64(11):753–754.

Long, "Ingredients and Coatings", *Frozen and Chilled Foods*, 1994; 48(2):14.

Meshitsuka, "Chemical Structures of Cellulose, Hemicelluloses, and Lignin," *Chemical modification of lignocellulosic materials*, 1996; 11–33.

Mohsenin, *Physical Properties of Plant and Animal Materials*, Chap. 2: "Structure and Chemical Composition", and Chap. 4: "Some Basic Concepts of Rheology", Gordon and Breach, publishers, 1986; 22–54:128–223.

Morton–Jones, "Polymer Processing", Chapman and Hall, publishers, 1989; Table of Contents.

Park et al., "Permeability and Mechanical Properties of Cellulose–Based Edible Films", *Journal of Food Science*, 1993; 58(6):1361–1364.

Park et al., "Fatty Acid Concentration Effect on Tensile Strength, Elongation, and Water Vapor Permeability of Laminated Edible Films", *Journal of Food Science*, 1994; 59(4):916–919.

Parrot et al., "Functional Properties of Various Fibers: Physical Properties", *Journal of Food Science*, 1978; 43:759–766.

"Precut Produce Sales to Soar Edible Coating Has Wide Application", *Food Institute Report*, American Institute of Food Distribution, Inc., Nov. 20, 1995:3.

Pryor, "The Rheology of Muscle", *Deformation and Flow in Biological Systems*, Chap. II, Edited by A. Frey–Wyssling, North Holland Publishing Company, publishers, 1952:157–193.

Rice, "Consuming Demands: Gas packaging, source–reduction and recloseable stand–up pouches help meet new consumer needs", *Food Processing*, 1996; 71–72.

Ruan et al., "Structure–function relationships of highly refined cellulose made from agricultural fibrous residues," *Applied Engineering in Agriculture*, 1996; 12(4):465–468.

Turbak et al., "Microfibrillated Cellulose, a New Cellulose Product: Properties, Uses, and Commercial Potential", *Journal of Applied Polymer Science: Applied Polymer Symposium*, 1983; 37:815–827.

Turbak, "Microfibrillated Cellulose—A New Composition of Commercial Significance," 1984 Nonwovens Symposium, Myrtle Beach, SC, Apr. 16–19, 1984, *TAPPI Press*, Atlanta, GA 1984;115–124.

* cited by examiner

CELLULOSE FIBER-BASED COMPOSITIONS AND THEIR METHOD OF MANUFACTURE

FIELD

The present invention relates to the manufacture of compositions from cellulose fiber material and the products obtained.

BACKGROUND

Many food and agricultural byproducts contain substantial amounts of cellulose. Cellulose is known to be useful in a wide range of markets. The food industry uses cellulose as a fat replacer, a component in products such as dietary fiber supplements, suspension agents, emulsifiers, water binding agents, as well as for edible films and coatings. The pharmaceutical industry uses cellulose as a component in bulking agents and dietary fibers for treatment and prevention of coronary heart disease, Type II diabetes, hypertension, diverticular disease, hemorrhoids, obesity, and so forth. Industrial applications of cellulose include use in filter medias, latex paint, and so forth.

Native cellulose fibers contain lignin, a polymeric material found in every type of vascular plant. Prior art processes for refining cellulose seek to remove lignin before any substantive treatment of the fibers. Lignin is known to cause cellulose fibers to stick together, thus reducing the surface area available for any subsequent reactions. It is believed that the presence of lignin also reduces the ability of cellulose microfibers to intertwine and entangle, thus reducing the structural integrity and/or strength of the final product.

Lignin removal is currently accomplished using extremely high temperatures and pressures. These extreme conditions cause raw material fragments to break apart, thus releasing the desired cellulose-based micro fibers. In addition, the raw materials are subjected to high concentrations of sodium hydroxide. See, for example, U.S. Pat. No. 5,817,381 to Chen, et al. Such a process is extremely energy-intensive in terms of the required temperatures and pressures. Further, the process produces a waste stream regarded as hazardous due to elevated pH levels caused by the use of large amounts of sodium hydroxide. Treatment of the waste stream adds to the cost of production and impacts the overall efficiency of this process.

Therefore, what is needed is a more efficient method of refining cellulose which is also safe for the environment.

SUMMARY

The present invention comprises a method for refining cellulose comprising soaking raw material in NaOH having a concentration of about five (5) to 50% (dry basis) to produce soaked raw material which steeps for about 6 hours to allow the NaOH to work, refining the soaked raw material to produce refined material, dispersing the refined material to produce dispersed refined material, and homogenizing the dispersed refined material to produce highly refined cellulose (HRC) gel having a lignin concentration of at least about one (1)% and a water retention capacity (WRC) of about 25 to at least about 56 g $H_2O$/g dry HRC. The method of the present invention produces a waste stream having a pH within a range of 8 to 9 and a reduced volume as compared to conventional cellulose refining processes.

In one embodiment, the method further comprises draining and washing the soaked raw material until the pH is down to about 8 to 9, bleaching the washed material at a temperature of about 20 to 100° C. in hydrogen peroxide having a concentration of about one (1) to 20% dry basis, and washing and filtering the bleached material to produce a filtered material having a solids content of about thirty (30)%.

In one embodiment, the filtered material is refined by being passed through a plate refiner. The plate refiner essentially breaks up the lignin as it shreds the material into refined cellulose particles.

In another embodiment, a cellulosic material having a lignin concentration of about 10 to 20% is described having a WRC of about 25 to at least about 56 g $H_2O$/g dry HRC. In another embodiment a HRC powder is described having a WRC of about 20 to 40 g $H_2O$/g dry HRC. These functional characteristics are known to be related to average pore diameter and surface area of the HRC material.

The method of the present invention is energy efficient because it does not require high pressures and temperatures as in prior art processes. Despite the presence of higher lignin concentrations in the final product, the HRC gel of the present invention has a water holding capacity that is at least as good or better than prior art products. Use of a plate refiner to break up the lignin rather than using high concentrations of NaOH has the added advantage of producing a non-hazardous waste stream having pH within a range of 8 to 9 and a reduced volume.

DETAILED DESCRIPTION

A new process for making HRC cellulose from agricultural byproducts such as corn cobs, husks, and stalks is disclosed. The HRC dispersion of the present invention is a highly viscous, semi-translucent gel. HRC embodiments comprise dried powders that are redispersable in water to form gel-like solutions. The functional characteristics of HRC are related to various properties, including water- and oil-retention capacity, average pore size, and surface area.

The method of the present invention for making HRC includes soaking chopped raw material, such as corn cobs, husks and stalks, in a mild NaOH solution. The soaked material is then drained and washed with tap water. This is followed by a bleaching step with hydrogen peroxide. The bleached material is washed and filtered before being subjected to a plate refiner which shreds the material into micro fibers. The micro fibers are passed through a screen filter and diluted to about one (1)% solids and dispersed before being homogenized at high pressure to produce HRC gel.

The present invention also includes an aqueous HRC gel having a lignin concentration of about one to twenty (1 to 20)%. The present invention also includes a freeze-dried HRC that has a lignin concentration of not more than about one to twenty (1 to 20) %. The HRC products of the present invention exhibit a surprisingly high WRC in the range of about 20 to at least about 56 g $H_2O$/g dry HRC. This high WRC is at least as good as, and in some cases, better than the WRC of prior art products having lower lignin concentrations. The HRC products exhibit similar good properties for ORC.

Figure 1:
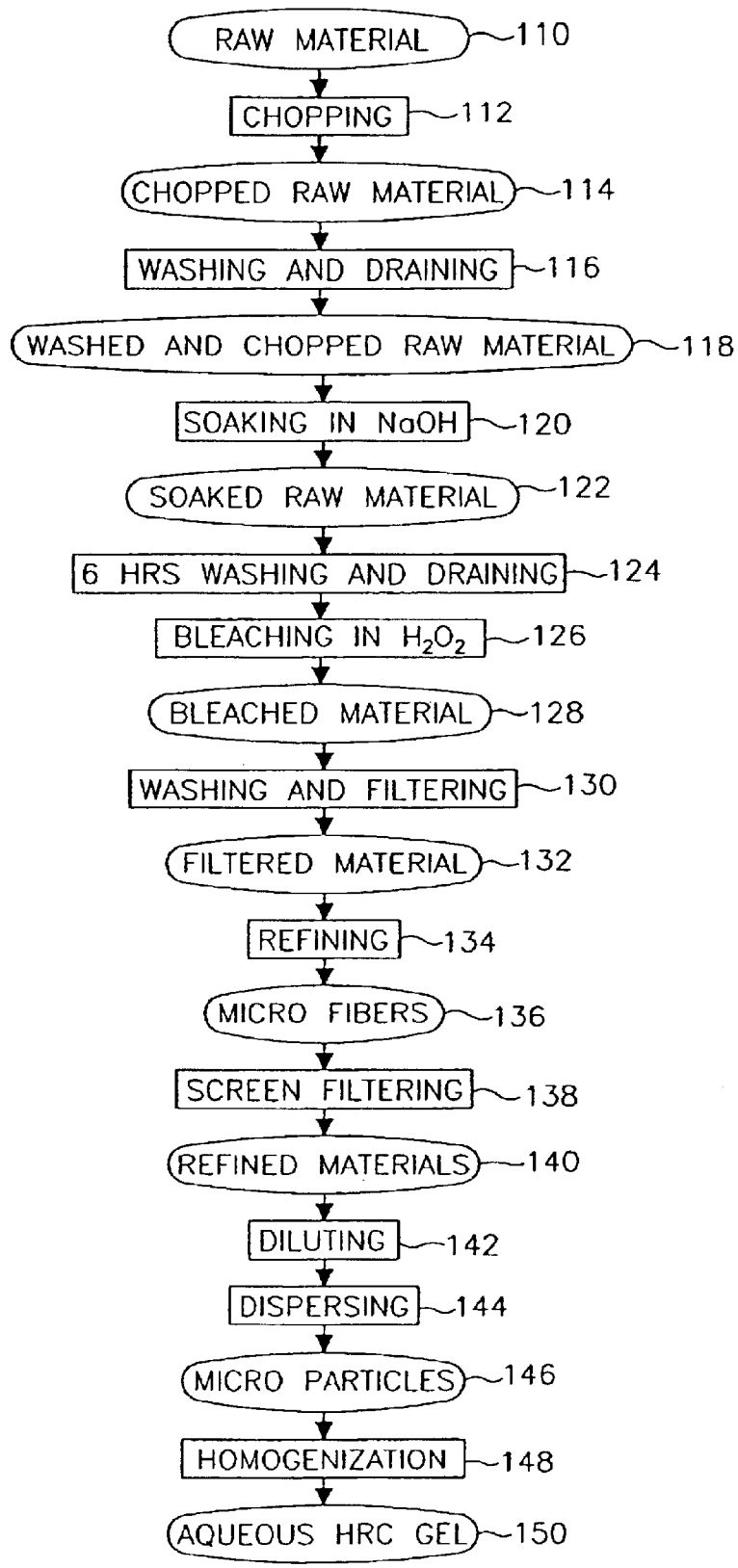
FIG. 1 is a process flow diagram illustrating a process for producing highly refined cellulose material in one embodiment of the present invention.

As shown in FIG. 1, the process of the present invention begins when raw material 110 is chopped 112 with a chopper into pieces less than or equal to about 5 cm×2 cm. Any conventional type of manual or automated chopper can be used, such as a knife or a larger commercially-sized chopper. The resulting chopped raw material 114 is then washed and drained 116, thus removing dirt and unwanted foreign materials. The washed and chopped raw material 118 is then soaked 120 in a NaOH solution having any suitable concentration, such as about one (1)%. In one embodiment, the NaOH concentration is about five (5) to 50% (dry basis). In another embodiment, the NaOH concentration is about 0.00357 to 0.025 g NaOH/g $H_2O$. Although prior art processes also soak cellulose in NaOH, the concentrations used are much higher, such as about ninety (90)% by weight or higher. The bath of NaOH is kept at a temperature of about 20 to 100° C. The temperature of the NaOH is maintained within this range in order to soften the material. The actual soaking time depends on NaOH concentration and temperature. In one embodiment, about 100 g of chopped raw material 114 is soaked in a 2.5 liter bath within a temperature range of about 20 to 80 degrees Centigrade for 10 to 90 minutes.

After having the chopped raw material sit for about 6 hours, the resulting soaked raw material 122 is subjected to another washing and draining 124 until the pH is down to around eight (8) to nine (9). In one embodiment, the soaked raw material 122 is washed with tap water. In one embodiment, the material is drained. This is followed by bleaching 126 the material with hydrogen peroxide at concentrations of about one (1) to 20% (dry basis). The material is bleached at about 20 to 100° C. for about five (5) to 200 min. The bleached material 128 is then subjected to washing with water, followed by filtering 130 with a screen. The screen can be any suitable size. In one embodiment, the screen has a mesh size of about 30 to 200 microns.

The filtered material 132 containing solids is then refined 134 in a plate refiner. In one embodiment, the filtered material 132 entering the plate refiner contains about four (4)% solids. The plate refiner effectively shreds the particles to create microfibers 136. The plate refiner, which is also called a disk mill, comprises a main body with two ridged steel plates for grinding materials. One plate, a refining plate, is rotated while a second plate remains stationary. The plates define grooves that aid in grinding. One plate refiner is manufactured by Sprout Waldron of Muncy, Pa. and is Model 105A. This plate refiner has a 40 horsepower motor that operates at 1775 rpm.

Water is fed into the refiner to assist in keeping the solids flowing without plugging. Water prevents the refiner's plates from overheating, which causes materials in the refiner to burn. The distance between the plates is adjustable on the refiner. To set refining plate distances, a numbered dial was affixed to the refining plate adjustment handle. The distance between the plates was measured with a micrometer, and the corresponding number on the dial was recorded. Several plate distances were evaluated and the setting number was recorded. A variety of flow consistencies were used in the refiner, which was adjusted by varying solids feed rate. The amount of water flowing through the refiner remained constant. Samples were sent through the refiner multiple times. In one embodiment the materials are passed one or more times through the plate refiner. The microfibers 136 are then separated 138 with a centrifuge to produce refined materials 140. The refined materials 140 are then diluted 142 in water until the solids content is about 0.5 to 37%. This material is then dispersed 144. In one embodiment, dispersement continues until a substantially uniform suspension is obtained, about 2 to 10 minutes. The uniform suspension reduces the likelihood of plugging.

The resulting dispersed refined materials, i.e., microparticles 146, are homogenized 148 in any known homogenizer operating at a suitable pressure. In one embodiment, pressures greater than about 5,000 psi are used. The resulting highly refined cellulose (HRC) gel 150 has a lignin content of about 1 to 20% by weight.

The use of a mild NaOH soaking and a refining step in the present invention prior to high pressure homogenization avoids the requirement of high temperature and high pressure cooking. This novel process further avoids the use of highly concentrated NaOH and the associated undesirable environmental impact of discharging waste water containing high levels of NaOH and organic compounds.

The process also avoids a need for an extensive recovery system. In one embodiment, the pH of the discharge stream in the present invention is only about 8 to 9. The method of the present invention has the further advantage of reducing water usage significantly over prior art processes, using only about one-half the amount of water as is used in conventional processes to produce to produce HRC gel.

In another embodiment, the HRC products of the present invention possess a WRC and ORC that are at least as good or even better than prior art products. This is true even though the products of the present invention have a higher lignin concentration than products made using conventional processes. It is assumed that the lignin which is present has been substantially inactivated to a sufficient degree so that the undesirable clumping did not subsequently occur. Another reason for these improved properties may be due to a porous network structure that is present in the HRC products of the present invention, but is lost in prior art products due to high concentration soaking in NaOH.

The invention will be further described by reference to the following example which is offered in order to further illustrate the present invention and the advantages thereof. This example is in no way meant to be limiting, but merely illustrative.

EXAMPLE

HRC Sample Preparation

The HRC samples were prepared according to the process described above in FIG. 1. In this experiment, dry corn stalks were used as the raw material. Specifically, about 100 g of dry corn stalks were chopped into small pieces. The chopped pieces were then soaked in NaOH solutions with concentrations from about 0.00357 to 0.025 g NaOH/g $H_2O$ for at least about 1 hour. After soaking, the material was drained and was allowed to sit for about 6 hours. The soaked material was then washed with tap water and bleached with hydrogen peroxide. Refining of the bleached material was performed with a commercial refiner. The refined material was then diluted to about 1% solids and was dispersed for about 5 to 10 minutes. High-pressure homogenization of the dispersed material was accomplished using a conventional homogenizer.

A portion of the resulting HRC gel was freeze-dried. Dried HRC samples were prepared using a freeze dryer, model RVT 4104-120 from Savant Instrument Inc. The samples were dried at −180° C. and zero (0) mmHg vacuum.
Determination of Water-Retention Capacity (WRC) and Oil-Retention Capacity (ORC)

Figure 2:
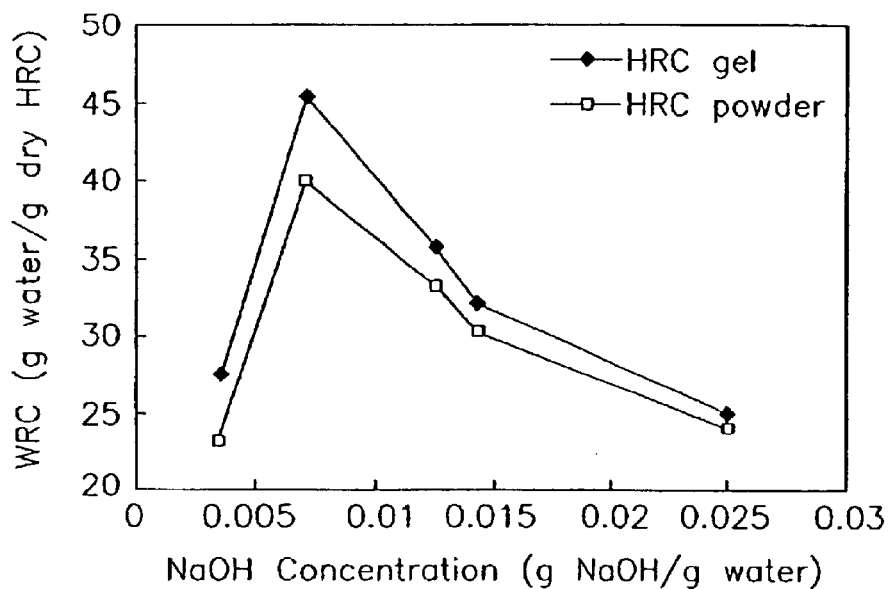
FIG. 2 is a graph showing water retention capacity (WRC) in grams of water per grams of dry highly-refined cellulose (HRC) versus NaOH concentration in grams of NaOH per grams of water as described in the Example herein.

WRC is a measure of the amount of water retained under standard centrifuge. The WRC values for both aqueous HRC gel and freeze-dried HRC were determined in accordance with Method 56-10 of the American Association of Cereal Chemists (AACC).
Determination of Pore Size and Microsurface Area Both pore size and microsurface area of freeze-dried HRC samples were measured using a Micromeritics 2000 from Micromeritice Instrument Co. The test sample was weighed with a precision of 0.0001 g. In all cases, the test sample weight was more than 100 mg to reduce the effect of weighing errors. At 85° C. and 6 mmHg vacuum, the sample was degassed, and moisture and other contaminants were removed. The degassed sample was analyzed in a nitrogen gas environment. Average pore diameter, BET surface area and Langmuir surface area were measured. The BET surface area values were determined by calculating the monolayer volume of adsorbed gas from the isotherm data. The Langmuir surface area values were obtained by relating the surface area to the volume of gas adsorbed as a monolayer.
Results and Discussion
WRC and ORC WRC values were measured for both the aqueous HRC gel and dried HRC powder using NaOH concentrations ranging from about 0.004 to 0.025 g NaOH/g water as shown in FIG. 2. The WRC values for both the HRC gel and HRC powder were in the range of about 20 to at least about 56 g $H_2O$/g dry HRC, depending on the concentration of the alkaline solutions. Maximum WRC values for the gel of at least about 56 g $H_2O$/g dry HRC were obtained with a NaOH concentration of about 0.007 g NaOH/g $H_2O$. Drying the HRC gel resulted in a reduction of about three (3) to 15% in WRC, which may be attributed to structural damages such as recrystallization caused by dehydration. However, the HRC powder also exhibited high WRC values, having a maximum WRC value of at least about 56 g $H_2O$/g dry HRC at a NaOH concentration of about 0.007 g NaOH/g $H_2O$.

Compared with WRC values of 3.5 to 10 g water/g dry powdered cellulose reported by Ang and Miller in Cereal Foods World, *Multiple Functions of Powdered Cellulose as a Food Ingredient*, Vol. 36 (7): 558–564 (1991), both the HRC gel and powder of the present invention have a much higher water-holding capacity.

Figure 3:
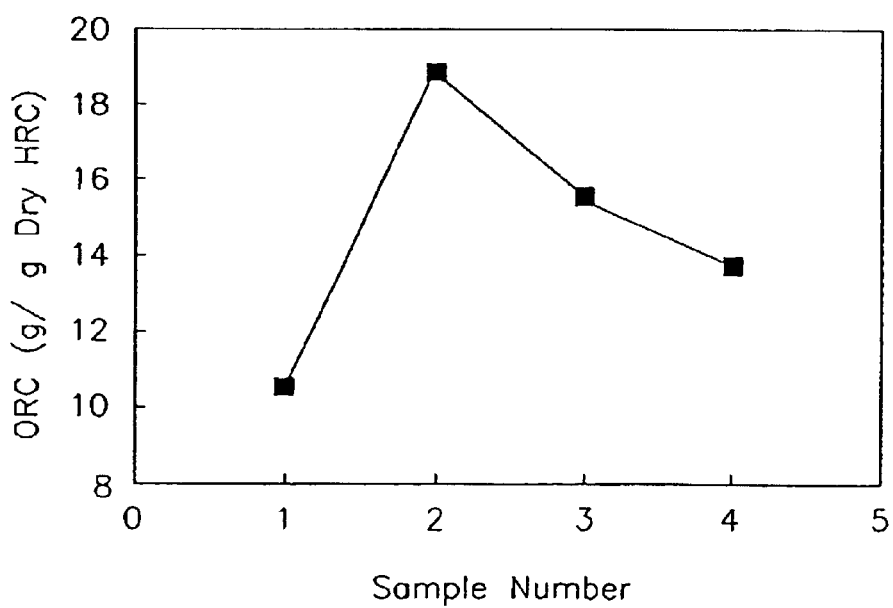
FIG. 3 is a graph showing ORC in grams per 100 grams of dry HRC versus NaOH concentration in grams of NaOH per grams of water as described in the Example herein.

Similar behavior was observed for ORC as shown in FIG. 3. ORC values for HRC gel ranged from about 10 to 19 g/100 g dry HRC in NaOH concentrations ranging from about one (1) to four (4) g NaOH/g water. HRC gel also showed a maximum ORC of about 19 g NaOH/g water at a NaOH concentration of about two (2) g NaOH/g water. These results are surprising in light of the lignin concentrations of about 1 to 20% by weight.

Figure 4:
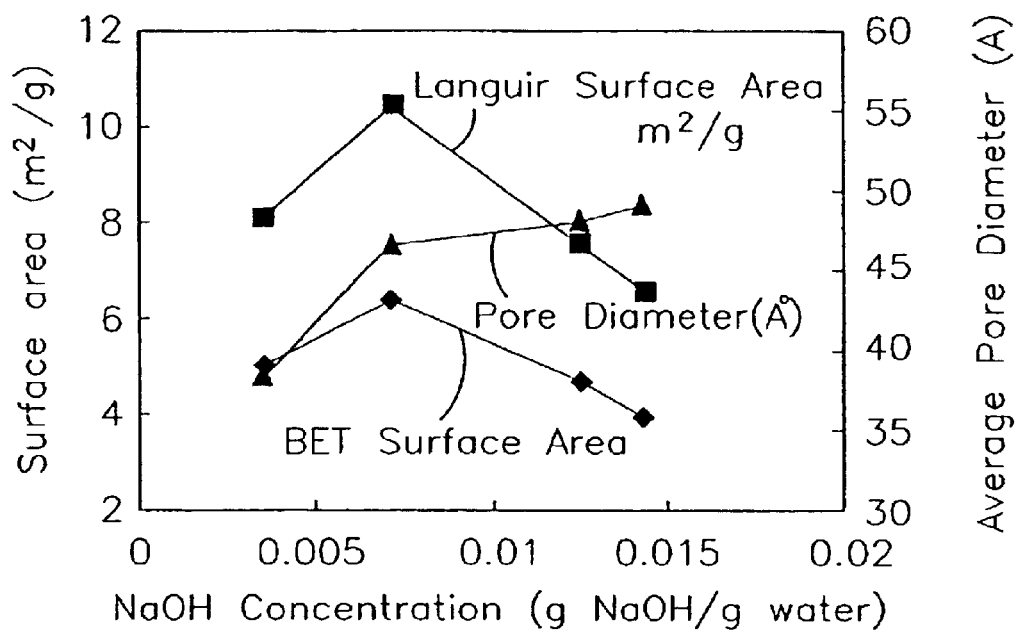
FIG. 4 is a graph showing surface area in square meters per gram and average pore diameter in Angstroms (Å) versus NaOH concentration in grams of NaOH per grams of water as described in the Example herein.

One possible reason for the improved WRC and ORC characteristics exhibited by the HRC gel and HRC powder of the present invention is that high concentration soaking might result in a microstructure unfavorable for holding water molecules.
Pore Size and Surface Area Average pore size is a measure of openness of the HRC structure. FIG. 4 shows that the average pore size increased rapidly as NaOH concentration was increased to 0.007%, then slowly with further increase in NaOH concentration. The surface area reached a maximum value at 0.007% NaOH, which also coincides with the maximum WRC discussed above. The decrease in surface area after the maximum value seems to suggest an increase in the ratio of large pores to small pores, which may contribute to the decrease in total surface area.

In one embodiment, the process of the present invention removes lignin to a sufficient degree or substantially inactivates it such that undesirable fiber clumping does not occur.

The HRC products of the present invention have uses in substrates where water binding or oil binding is important such as in foods, soil, and in filtration media. The HRC products also have use in applications where a large surface area is important, such as accelerating chemical reactions.

It is to be appreciated that the method and product of the present invention have been described in particular detail with respect to preferred processes and formulations. The present invention, however, is not intended to be limited to these preferred embodiments. One skilled in the art will readily recognize that the actual method and product may be adjusted to accommodate particular conditions.

What is claimed is:

1. A highly refined cellulose (HRC) having a lignin concentration of at least 1% by weight and a water retention capacity of at least about 20 g $H_2O$/g dry HRC.

2. The HRC of claim 1 wherein the HRC has an oil retention capacity of at least about 10 g/g dry HRC.

3. The HRC of claim 1 wherein the HRC is dehydrated or a dispersion.

4. A composition comprising the HRC of claim 1.

5. The HRC of claim 1 wherein the HRC has a Langmuir surface area of at least about 7 $m^2$/g.

6. The HRC of claim 1 wherein the HRC has an average pore diameter of at least about 5 angstroms.

7. A composition comprising an HRC and a food, wherein the HRC has a lignin concentration of at least 1% by weight and a water retention capacity of at least about 20 g $H_2O$/g dry HRC.

8. The composition of claim 7 wherein the HRC is dehydrated or a dispersion.

9. The composition of claim 7 wherein the HRC has an oil retention capacity of at least about 10 g/g dry HRC.

10. The composition of claim 7 wherein the HRC has an average pore diameter of at least about 5 angstroms.

11. The composition of claim 7 wherein the HRC has a Langmuir surface area of at least about 7 $m^2$/g.

12. A highly refined cellulose (HRC) having a lignin concentration of at least 1% by weight, a water retention capacity of at least about 20 g $H_2O$/g dry HRC, and an oil retention capacity of at least about 10 g/g dry HRC.

13. A composition comprising a highly refined cellulose (HRC) having a lignin concentration of at least 1% by weight and a water retention capacity of at least about 20 g $H_2O$/g dry HRC.

14. A highly refined cellulose (HRC) having a lignin concentration of at least 1% by weight, a water retention capacity of at least about 20 g$H_2O$/g dry HRC, and a Langmuir surface area of at least about 7 $m^2$/g.

15. A composition comprising an HRC and a food, wherein the HRC has a lignin concentration of at least 1% by weight, a water retention capacity of at least about 20 g $H_2O$/g dry HRC, and an average pore diameter of at least about 5 angstroms.

16. A composition comprising an HRC and a food, wherein the HRC has a lignin concentration of at least 1% by weight, a water retention capacity of at least about 20 g $H_2O$/g dry HRC, and a Langmuir surface area of at least about 7 $m^2$/g.

17. A highly refined cellulose (HRC) having a lignin concentration of at least 1% by weight, a water retention capacity of at least about 20 g $H_2O$/g dry HRC, and an average pore diameter of at least about 5 angstroms.

* * * * *

UNITED STATES PATENT AND TRADEMARK OFFICE
CERTIFICATE OF CORRECTION

PATENT NO. : 7,074,300 B2 Page 1 of 1
APPLICATION NO. : 10/303256
DATED : July 11, 2006
INVENTOR(S) : Lundberg et al.

It is certified that error appears in the above-identified patent and that said Letters Patent is hereby corrected as shown below:

At page 1, paragraph (75), for the first named inventor, Brock Lundberg, delete "*St. Paul, MN*" and insert --*Roberts, WI*-- therefor.

At page 1, paragraph (75), for the second named inventor, Lin Gu, delete "*St. Paul, MN*" and insert --*Seattle, WA*-- therefor.

Signed and Sealed this

Sixth Day of March, 2007

JON W. DUDAS
*Director of the United States Patent and Trademark Office*